United States Patent
Diehl et al.

(10) Patent No.: US 6,219,725 B1
(45) Date of Patent: Apr. 17, 2001

(54) METHOD AND APPARATUS FOR PERFORMING DIRECT MEMORY ACCESS TRANSFERS INVOLVING NON-SEQUENTIALLY-ADDRESSABLE MEMORY LOCATIONS

(75) Inventors: Michael R. Diehl, Loveland, CO (US); Maynard Hammond, Lawrenceville, GA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/141,801

(22) Filed: Aug. 28, 1998

(51) Int. Cl.[7] .............................. G06F 12/02; G06F 12/00; G06F 12/06; G06F 13/00; G06F 9/00
(52) U.S. Cl. ........................ 710/26; 710/22; 710/23; 710/27; 710/28; 709/100; 709/104; 709/107; 709/236
(58) Field of Search ........................ 710/22, 23, 24, 710/25, 26, 27, 28; 709/107, 100, 104, 236

(56) References Cited

U.S. PATENT DOCUMENTS

| | | | | |
|---|---|---|---|---|
| 4,545,014 | * | 10/1985 | Oguchi | 710/22 |
| 4,847,750 | * | 7/1989 | Daniel | 710/26 |
| 5,005,121 | * | 4/1991 | Nakada et al. | 710/26 |
| 5,291,582 | * | 3/1994 | Drako et al. | 710/26 |
| 5,404,522 | * | 4/1995 | Carmon et al. | 709/107 |
| 5,440,687 | * | 8/1995 | Coleman et al. | 709/236 |
| 5,724,583 | * | 3/1998 | Carmon et al. | 709/100 |
| 5,724,587 | * | 3/1998 | Carmon et al. | 709/104 |

OTHER PUBLICATIONS

Dong Chen, et al., QCDSP: A Teraflop Scale Massively Parallel Supercomputer, 1997, <http://www.supercomp.org/sc97/proceedings/TECH/CHRIST/INDEX.HTM>.*

David Kotz and Nils Nieuwejaar, Dynamic File–Access Characteristics of a Production Parallel Scientific Workload, 1994, IEEE 1063–9535/94, pp. 640–649.*

* cited by examiner

Primary Examiner—Thomas Lee
Assistant Examiner—Katharina Schuster

(57) ABSTRACT

A method and apparatus for transferring data in a computer system between a first memory region and second memory region in a single Direct Memory Access (DMA) operation. The first memory region, the second memory region, or both the first and second memory regions can include sub-regions of sequentially-addressable memory locations that are separated, within their respective regions, by a stride. The method and apparatus are particularly well adapted for use in computer graphics systems that include one or more regions of memory, such as frame buffers, that are organized in a rectangular manner as a plurality of contiguous but not sequentially-addressable memory locations within the memory of the graphics system.

23 Claims, 11 Drawing Sheets

DMA HOST MEMORY HIGH ORDER ADDRESS BITS (DMA(H))
550

| MSB | | | | | | | | | | | | | | | | | | | | | | | | | | | | | | | LSB |
|---|---|---|---|---|---|---|---|---|---|---|---|---|---|---|---|---|---|---|---|---|---|---|---|---|---|---|---|---|---|---|---|
| 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 |

DMAH

| FIELD | BITS | FUNCTION |
|---|---|---|
| DMAH | 31:0 | HIGH ORDER BITS OF SOURCE OR TARGET ADDRESS. |

FIG. 6A

DMA SOURCE HEIGHT/WIDTH/STRIDE (DMAS H/W/S) ~510

| MSB | | | | | | | | | | | | | | | | | | | | | | | | | | | | | | | LSB |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| SHGHT | | | | | | | | | | SWDTH | | | | | | | | | | | SSTRD | | | | | | | | | | V |

| FIELD | BITS | FUNCTION |
|---|---|---|
| SHGHT | 31:22 | SOURCE HEIGHT |
| SWDTH | 21:11 | SOURCE WIDTH |
| SSTRD | 10:1 | SOURCE STRIDE |
| V | 0 | VALIDITY. THIS REGISTER'S CONTENTS ARE VALID. |

FIG. 6B

DMA TARGET HEIGHT/WIDTH/STRIDE (DMAT H/W/S) ~520

| MSB | | | | | | | | | | | | | | | | | | | | | | | | | | | | | | | LSB |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| THGHT | | | | | | | | | | TWDTH | | | | | | | | | | | TSTRD | | | | | | | | | | V |

| FIELD | BITS | FUNCTION |
|---|---|---|
| THGHT | 31:22 | TARGET HEIGHT |
| TWDTH | 21:11 | TARGET WIDTH |
| TSTRD | 10:1 | TARGET STRIDE |
| V | 0 | VALIDITY. THIS REGISTER'S CONTENTS ARE VALID. |

FIG. 6C

DMA LOW ORDER SOURCE ADDRESS (DMAS (L)) — 530

| MSB | | | | | | | | | | | | | | | | | | | | | | | | | | | | | | | LSB |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| LOSA | | | | | | | | | | | | | | | | | | | | | | | | | | | | | C | | V |

| FIELD | BITS | FUNCTION |
|---|---|---|
| LOSA | 31:3 | LOW ORDER SOURCE ADDRESS BITS. INDICATES WHERE DMA STARTS READING. |
| C | 2 | SOURCE TARGET IDENTIFIER. |
| RESERVED | 1 | RESERVED FOR FUTURE USE. |
| V | 0 | VALIDITY. THIS REGISTER'S CONTENTS ARE VALID. |

FIG. 6D

DMA LOW ORDER TARGET ADDRESS (DMAT (L)) — 540

| MSB | | | | | | | | | | | | | | | | | | | | | | | | | | | | | LSB |
|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 1 0 |
| LOTA | | | | | | | | | | | | | | | | | | | | | | | | | | | | | V |

| FIELD | BITS | FUNCTION |
|---|---|---|
| LOTA | 31:3 | LOW ORDER TARGET ADDRESS BITS. INDICATES WHERE DMA STARTS WRITING. |
| RESERVED | 2:1 | RESERVED FOR FUTURE USE. |
| V | 0 | VALIDITY. THIS REGISTER'S CONTENTS ARE VALID. |

FIG. 6E

METHOD AND APPARATUS FOR PERFORMING DIRECT MEMORY ACCESS TRANSFERS INVOLVING NON-SEQUENTIALLY-ADDRESSABLE MEMORY LOCATIONS

FIELD OF THE INVENTION

The present invention relates generally to direct memory access controllers and, more particularly, to a method and apparatus for performing direct memory access transfers to and/or from non-sequentially-addressable memory locations.

DISCUSSION OF THE RELATED ART

In a conventional computer system, a significant amount of processor time is utilized transferring data between regions of memory. Such data transfers may occur between one region of memory and another, between one region of memory and an I/O device, or between one I/O device and another. Due to the principle of spatial locality, these transfers frequently involve a large quantity (e.g., bytes, words, or blocks) of data that is read from and written to regions of memory that are spatially related (e.g., located in contiguous regions of memory). To free the processor from the burden of having to perform these data transfers itself, many computer systems include a direct memory access (DMA) controller.

A DMA controller is a specialized processor that performs transfers of spatially-related data between one region of memory and another, between one region of memory and an I/O device, and between one I/O device and another without intervention by the processor, thereby freeing the processor to perform other tasks. In most computer systems, the DMA controller is external to the processor and connected to the main memory bus of the computer system through a bus adapter, and is capable of controlling the bus.

FIG. 1 depicts a functional block diagram of a conventional computer system 100 that includes a processor 110, a DMA controller 120, and a memory 130 that are interconnected by a bus 140. As shown in FIG. 1, the memory 130 includes a number of contiguous memory locations that are organized in a sequentially-addressable manner, in either row-major order or column-major order. When organized in row-major order, successive row memory locations are adjacent in memory; when organized in column-major order, successive column memory locations are adjacent in memory.

In the illustrative example shown in FIG. 1, the memory locations in memory 130 are organized in row-major order from address 0x00 to address 0xFF (that is, Hexadecimal address 00 through Hexadecimal Address FF). However, it should be appreciated that in other computer systems, the memory locations in memory 130 may alternatively be organized in column-major order. Memory 130 is depicted as having a number of rows (Row 1 through Row I) defining the height of the memory region, and a number of columns (Column 1 through Column J) defining the width of the memory region. Because memory 130 is organized in row-major order, the address of the first storage location in Row I is the next addressable storage location after the last storage location in Row I-1.

DMA controller 120 typically includes a number of registers 122, 124, 126, including a source address register 122, a destination address register 124, and a length register 126 that are initialized (i.e., written to) by the processor 110 for each DMA operation. For each DMA operation, the processor 110 writes a starting source memory address from which data is to be copied in source address register 122, a starting destination memory address to which the data is to be copied in destination address register 124, and a length (i.e., the quantity) of data to be transferred by the DMA controller 120 in the DMA operation. Depending on the computer system, the length of the data to be transferred is typically defined in terms of bytes, words, or quad-words (i.e., 64 bits).

After registers 122, 124 and 126 are initialized by processor 110, the processor relinquishes control of bus 140 to the DMA controller 120 to perform the data transfer. The DMA controller 120 reads data from memory 130 starting at the memory location specified in the source address register 122 and writes that data to the memory locations starting at the memory location specified in the destination address register 124. After this transfer, DMA controller 120 reads data from the next sequential source memory location (e.g., starting source memory address+1) and writes that data to the next sequential destination memory location (e.g, starting destination memory address+1). Generally, the DMA controller 120 includes a number of internal counters (not shown) that are incremented after each transfer to point to the next source memory location to be read and the next destination memory location to be written. The DMA controller 120 continues sequentially reading data from the next sequential source memory location and writing that data to the next sequential destination memory location until the amount of data specified in the length register 126 has been transferred. Once the amount of data specified in the length register 126 has been transferred, control of bus 140 is returned to processor 110, whereupon the DMA operation is complete. During the data transfer, the processor 110 is free to perform other tasks. As used herein, the term "DMA operation" refers to the initialization of registers 122, 124, and 126 by the processor 110 and the subsequent transfer of data by the DMA controller 120.

As described above, for each DMA operation, a number of registers are initialized by the processor 110 prior to transferring data from one memory location to another. Typically, this initialization is performed by the processor 110 in a programmed I/O mode (i.e., a conventional write operation by the processor 110) and can consume a significant amount of time (e.g., the time to perform three write operations-one for each register) when the quantity of data to be transferred is small. Because of the time involved in initializing these registers, the use of DMA controller 120 increases the performance of the computer system only when the quantity of data to be transferred from one portion of memory to another is relatively large. That is, when the time spent initializing registers 122, 124, and 126 and performing the DMA data transfer is less than the time it would take to perform the same transfer using conventional read and write operations by the processor 110.

Furthermore, because registers 122, 124, and 126 include only the starting source address, the starting destination address, and the quantity of data to be transferred, the data that is to be transferred during the DMA operation must necessarily be organized in sequentially-addressable memory locations in both source and destination regions of memory. Although this latter requirement is met in many computer systems, other computer systems can include memory regions that are not organized in a sequentially-addressable manner. That is, even though the memory of the computer system as a whole is generally organized in a sequentially-addressable manner, regions of that memory may be allocated so that memory locations within a region are contiguous within the region, but not sequentially-addressable.

For example, FIG. 2 illustrates a computer graphics system that includes two different regions of memory in which memory locations are contiguous within each region, but not sequentially-addressable. The graphics system 200 includes host processor 210, bus adapter 220, host memory 230, graphics hardware 240, and graphics memory 250. The host processor 210 communicates with host memory 230 over host memory bus 260, and the graphics hardware 240 communicates with graphics memory 250 over graphics memory bus 270. Bus adapter 220 permits communication between devices on the host memory bus 260 and devices on the graphics memory bus 270. One example of a bus adapter 220 that is frequently used in graphics systems is an Intel® 440BX bus adapter chip set. The graphics system 200 may also include some additional memory (not shown) that is directly connected to the host processor 210. In the exemplary graphics system 200 shown in FIG. 2, the host memory 230 is organized in row-major order and includes a number of sequentially-addressable memory locations ranging from address N to address N+4W−1, where "W" denotes the width of each row of memory locations in the host memory region.

Graphics hardware 240 may include number of special purpose processors such as a geometry accelerator, a rasterizer, texture mapping hardware, etc., as is well known in the art. Graphics hardware 240 may also include a DMA controller (not shown) that can be used to transfer data between storage locations in host memory 230 and storage locations in graphics memory 250. In most graphics systems, graphics memory 250 is partitioned into a number of rectangular regions of contiguous memory locations 252, 254, each having an associated height (in terms of rows) and width (in terms of columns). These rectangular (i.e., contiguous, but not sequentially-addressable) regions of memory 252, 254 may be allocated for use as frame buffers, or for other uses. For example, rectangular region 252 may be allocated as a frame buffer representing the imageable area of a display screen, while rectangular region 254 may be allocated as a frame buffer representing a particular windowing area on the display screen.

It should be appreciated that although the graphics memory 250 as a whole is organized as an array of sequentially-addressable storage locations, the rectangular regions of memory 252, 254 are not; rather, each of the rectangular regions of memory 252, 254 includes sub-regions of sequentially-addressable storage locations that are separated from one another by a distance. The distance separating sub-regions of sequentially-addressable storage locations (i.e., the distance separating the first storage location in Row I from the first storage location in Row I−1) is termed the "stride" of rectangular region 252, denoted by "S", while the width of rectangular region 252 (i.e., the width of each of the sub-regions of sequentially-addressable storage locations) is denoted by "W'". This rectangular organization of memory regions 252, 254 significantly reduces the effective use of DMA controllers because conventional DMA controllers can only transfer data between source and destination locations which are both sequentially-addressable. Thus, because not all of the storage locations in rectangular regions 252, 254 are sequentially-addressable within their respective region (e.g., location N'+W'−1 and location N'+S), separate DMA operations are required for writing to or reading from each sub-region (e.g., row) of sequentially-addressable storage locations.

For example, when it is desired to transfer data stored at storage locations N through N+4W−1 in host memory 230 to storage locations N' through N'+3S+W'−1 in rectangular region 252 of graphics memory 250, the following steps are traditionally performed. First, the host processor 210 initializes the DMA controller's registers with the address of the starting source location (e.g., address N), the address of the starting destination location (e.g., address N'), and the length of data to be transferred (e.g., W). This initialization is performed by the host processor 210 by writing DMA registers (e.g., registers 122–126 in FIG. 1) to enable the DMA controller (e.g., DMA controller 120 in FIG. 1) to perform one DMA operation. Once initialized, the host processor 210 relinquishes the bus 260 to the DMA controller, after which the DMA controller sequentially transfers the data from locations N through N+W−1 in host memory 230 to locations N' through N'+W'−1 in rectangular region 252 of graphics memory 250. Upon completion of the DMA operation, bus control is returned to the host processor 210. The host processor then initializes the DMA controller's registers for the next transfer (e.g., for transferring data from locations N+W through N+2W−1 in host memory 230 to locations N'+S through N'+S+W'−1 in rectangular region 252). Thus, to transfer all of the data stored at locations N through N+4W−1 in host memory 230 to rectangular region 252 of graphics memory 250, a number of separate DMA operations are traditionally performed, each performed subsequent to an associated initialization of registers (e.g., registers 122–126 in FIG. 1) by the host processor 210 in a programmed I/O operation. In the exemplary graphics system 200 of FIG. 2, four such separate DMA operations would be traditionally performed, as the rectangular region 252 of graphics memory 250 includes four separate sub-regions of sequentially-addressable storage locations.

SUMMARY OF THE INVENTION

According to an aspect of the present invention, a method and apparatus for performing direct memory access is provided to transfer data, in a single direct memory access (DMA) operation, between source and target regions of memory that include storage locations that are not sequentially-addressable. In particular, either or both the source memory region and the target memory region can include storage locations that are not sequentially-addressable. Because such data transfers can be performed in a single DMA operation, embodiments of the present invention permit DMA operations involving memory regions that include non-sequentially-addressable storage locations to be performed significantly faster than with conventional DMA methods and controllers. Furthermore, a host processor only needs to initialize DMA registers once to transfer all of the data from the source memory region to the target memory region, even when either or both the source memory region and the target memory region include non-sequentially-addressable storage locations.

According to one embodiment of the present invention, a direct memory access (DMA) system for transferring data between a first memory region and a second memory region is provided. The first memory region includes a first plurality of memory locations and the second memory region includes a second plurality of memory locations, the first plurality of memory locations being separated into a plurality of sub-regions of sequentially-addressable memory locations, each of the plurality of sub-regions being separated by a stride of at least one addressable memory location. The DMA system includes a DMA controller that is configured to copy the data between each of the first plurality of memory locations and each of the second plurality of memory locations in a single DMA operation. In one aspect of this embodiment, the second memory region can be separated into a second plurality of sub-regions of sequentially-addressable sub-regions that are separated by a second stride. Moreover, in another aspect of this embodiment, the number of sub-regions in the first memory region, as well as the number of sequentially-addressable memory locations within each sub-region of the first memory region can be different than those in the second memory region.

According to another embodiment of the present invention, a method of transferring data between a first memory region and a second memory region is provided for use in a computer system. The first memory region includes a first plurality of memory locations and the second memory region includes a second plurality of memory locations, the first plurality of memory locations being separated into a plurality of sub-regions of sequentially-addressable memory locations, each of the plurality of sub-regions being separated by a stride of at least one addressable memory location. The method includes a step of copying the data between each of the first plurality of memory locations and each of the second plurality of memory locations in a single DMA operation. In one aspect of this embodiment, the step of copying the data includes steps of copying data from a first sub-regions of the plurality of sub-regions to the second memory region, advancing to a next sub-region of the plurality of sub-regions based upon the stride, and copying data from the next sub-regions to the second memory region, all in the single DMA operation.

According to a further embodiment of the present invention, method of transferring data between a first memory region and a second memory region is provided for a computer system. The first memory region includes a first plurality of memory locations and the second memory region includes a second plurality of memory locations, the first plurality of memory locations being separated into a plurality of sub-regions of sequentially-addressable memory locations, each of the plurality of sub-regions being separated by a stride of at least one addressable memory location. The method includes a step of using the stride separating each of the plurality of sub-regions to copy the data between the first memory regions and the second memory region in a direct memory access (DMA) operation. In one aspect of this embodiment, the stride can be used to copy the data between each of the first plurality of memory locations and each of the second plurality of memory locations in a single DMA operation.

Further features and advantages of the present invention as well as the structure and operation of various embodiments of the present invention are described in detail below with reference to the accompanying drawings. In the drawings, like reference numerals indicate like or functionally similar elements or method steps. Additionally, the left-most one or two digits of a reference numeral identifies the drawing in which the reference numeral first appears.

BRIEF DESCRIPTION OF THE DRAWINGS

Illustrative embodiments of the present invention are described by way of example with reference to the accompanying drawings, in which:

FIGS. 6A–E show the bit allocation and meaning of information stored in the source and target registers of FIG. 5.

DETAILED DESCRIPTION

Figure 2:
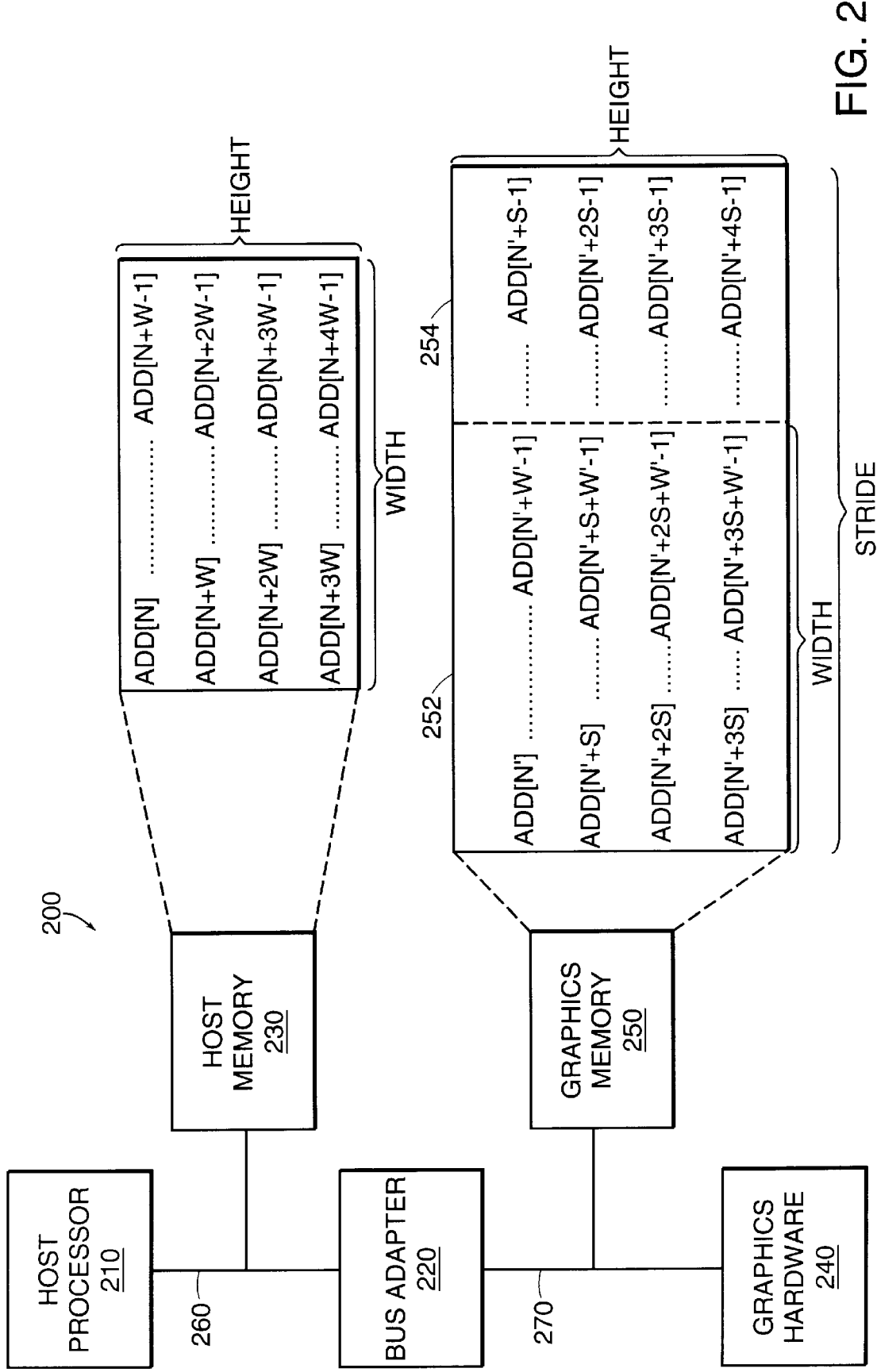
FIG. 2 is a functional block diagram of an exemplary computer graphics system suitable for use with the present invention that includes a host memory organized in a sequentially-addressable manner and a graphics memory organized in a rectangular manner.
Figure 3:
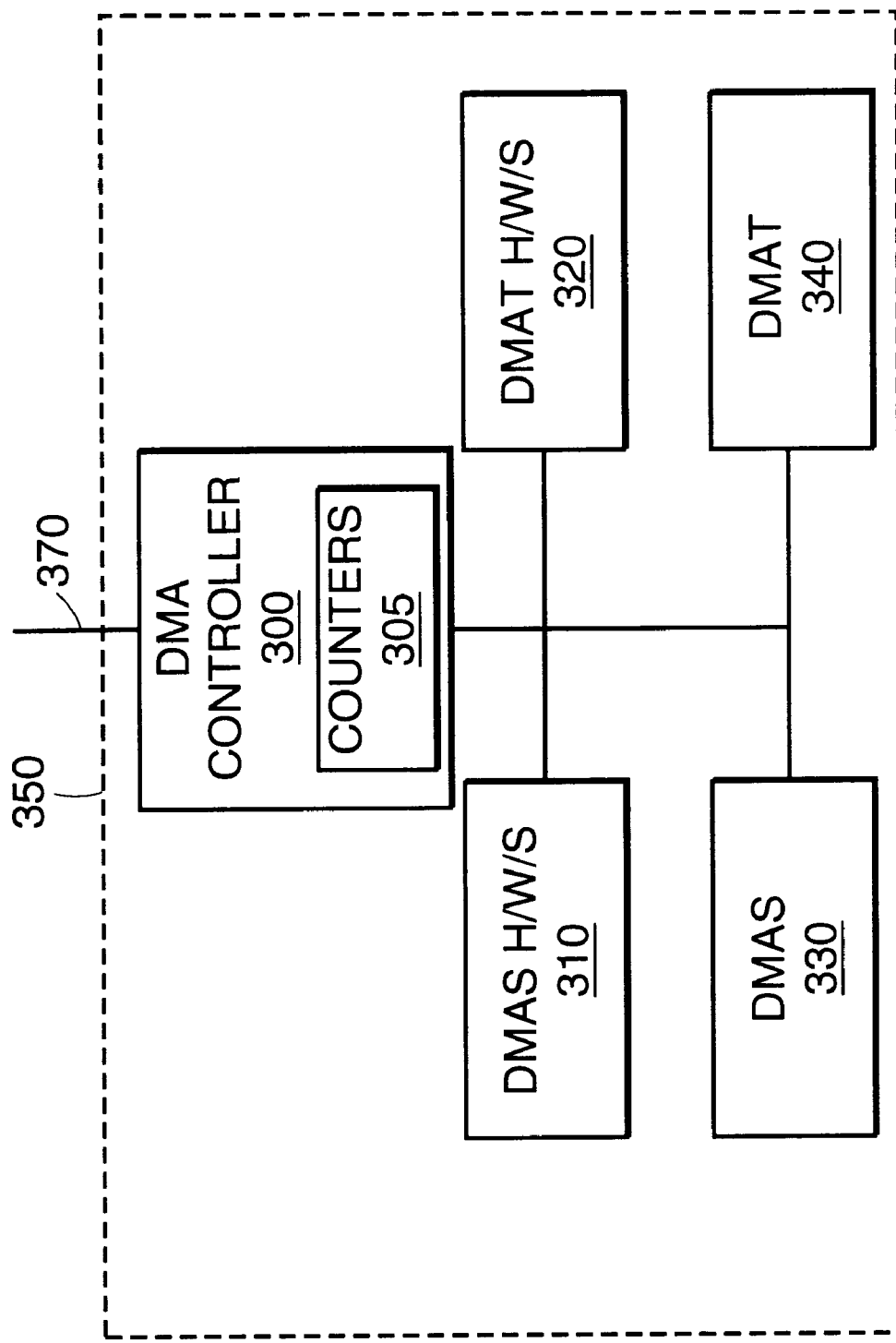
FIG. 3 is a functional block diagram of a DMA controller according to one embodiment of the present invention.

FIG. 3 is a functional block diagram of a DMA controller 300 according to one embodiment of the present invention. DMA controller 300 is particularly well adapted for use in computer graphics systems that include contiguous regions of memory that are not sequentially-addressable, such as the graphics system 200 described above with respect to FIG. 2, and graphics system 400, described further below with respect to FIG. 4. In particular, DMA controllers of the present invention can, in a single DMA operation, transfer data between source and target (i.e., destination) regions of memory that include memory locations that are not sequentially-addressable within their respective region.

Advantageously, either the source memory region, the target memory region, or both can include memory locations that are not sequentially-addressable within their respective region(s). This permits DMA operations involving non sequentially-addressable source and/or target memory regions to be performed significantly faster than using conventional DMA controllers. In particular, because embodiments of the present invention take account of the distance (i.e., the stride) that may separate sub-regions of sequentially-addressable memory locations within source and target regions of memory, DMA transfers between the source and target regions of memory can be performed in a single DMA operation.

Although embodiments of the present invention are described below with respect to memory that is organized in row-major order, it should be appreciated that the present invention can be used with computer systems in which all memory is organized in column-major order, as well as computer systems in which one region of memory (e.g., host memory 230 in FIG. 2) is organized in row-major order, and another (e.g., graphics memory 250 in FIG. 2) is organized in column-major order. As used herein, the term "memory region" refers to any locations in physical memory, such as RAM, ROM, etc., as well as memory mapped I/O devices and others now or later developed.

Figure 1:
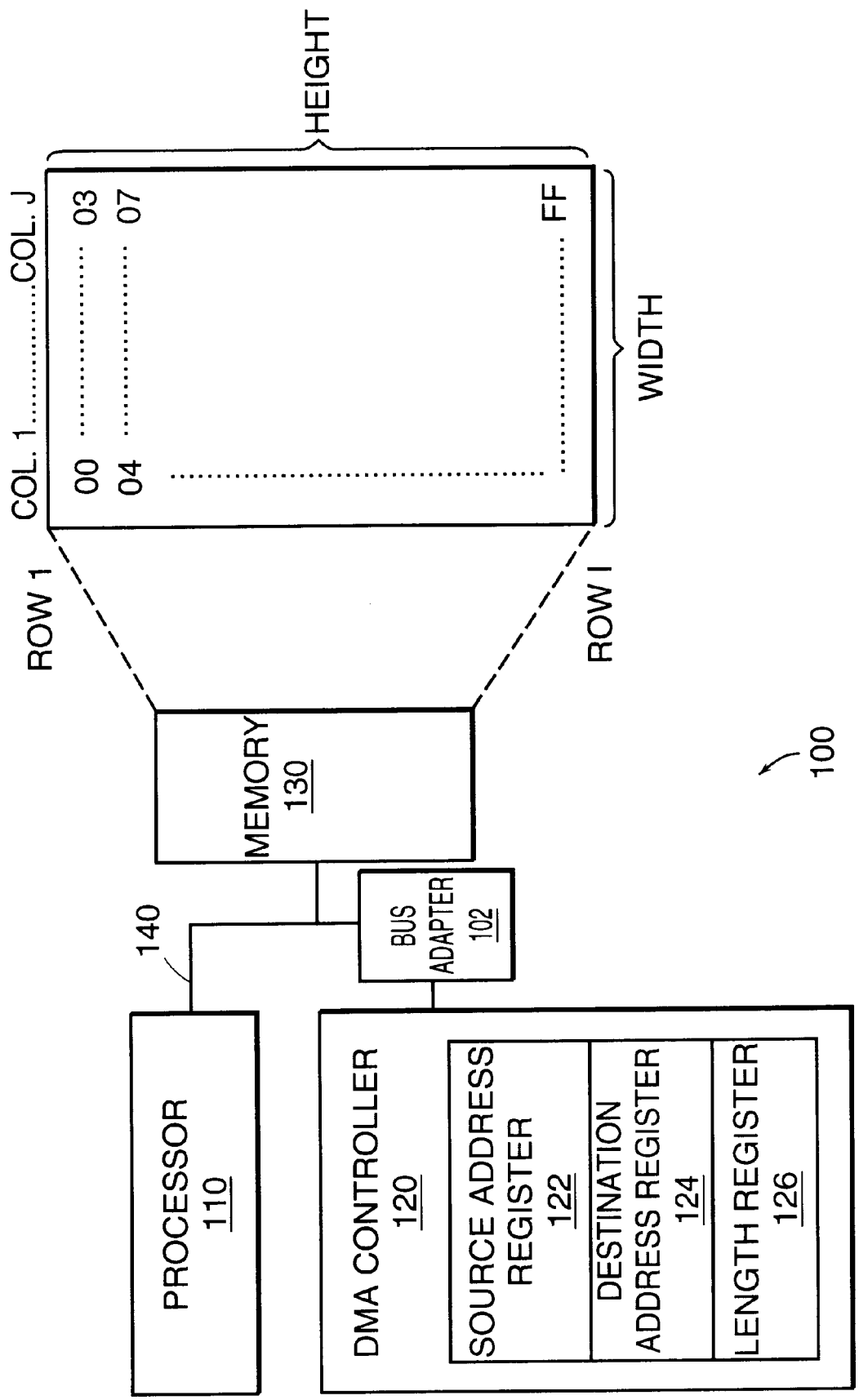
FIG. 1 is functional block diagram of a conventional computer system that includes a DMA controller.

DMA controller 300 can be used in a wide variety of graphics systems, such as 2-D and 3-D graphics systems, CAD/CAM systems, as well as other types of graphics systems, such as printers and scanners. However, it should be appreciated that DMA controller 300 can be used in any computer system, even those in which all regions of memory are sequentially-addressable, such as the computer system of FIG. 1. DMA controller 300 may be constructed as a separate processor or state machine within the graphics hardware (e.g., graphics hardware 440 in FIG. 4), or as a processor or state machine that is separate from the graphics hardware. Furthermore, operational control of the DMA controller 300 may be implemented in software, in firmware, or in hardware, or in any combination of software, firmware, and hardware.

As shown in FIG. 3, the DMA controller 300 communicates with other devices in the graphics system, such as host processor 210, host memory 230, and graphics memory 250 over a bus 370. Bus 370 can be a host memory bus (e.g., 260 in FIG. 2), a graphics memory bus (e.g., 270 in FIG. 2), or another bus that is capable of communicating with devices on the host memory bus and the graphics memory bus, for example, via a bus adapter (e.g., 220 in FIG. 2). The DMA controller 300 also communicates with a number of different registers 310, 320, 330, 340 that store source and target (i.e., destination) information. In one embodiment of the present invention, the DMA controller 300 and registers 310, 320, 330, 340 are included as part of a single DMA system 350. This embodiment is graphically depicted by the dashed line surrounding the DMA controller 300 and registers 310–340. However it should be appreciated that registers 310–340 can also be separate from the DMA controller 300, in any form of memory that is accessible to the host processor (e.g., host processor 210 in FIG. 2) and the DMA controller 300. Also, as shown in FIG. 3 and described further below, the DMA controller 300 includes a number of internal counters 305.

Register 310 is a Source Height/Width/Stride (DMAS H/W/S) register that stores information identifying the number of rows of the source memory region to be read (i.e., the height of the source memory region in the illustrative row-major ordered embodiment of FIG. 2). Register 310 also stores information identifying the number of columns of the source memory region to be read in each row of the source memory region (i.e., the width of the source memory region in the illustrative row-major ordered embodiment of FIG. 2), and the distance between the first element of a row of the source memory region and the first element of the next row of the source memory region (i.e., the stride of the source memory region in the illustrative row-major ordered embodiment of FIG. 2).

Register 320 is a DMA Target Height/Width/Stride (DMAT H/W/S) register that stores information identifying the number of rows of the target memory region to be written (e.g., the height of the target memory region), the number of columns of the target memory region to be written in each row of the target memory region (e.g., the width of the target memory region), and the distance between the first element of a row of the target memory region and the first element of the next row of the target memory region (e.g., the stride of the target memory region).

Register 330 is a Source Address (DMAS) register that stores the starting source address of the source memory region from which data is to be transferred (e.g., read from the source memory region), and register 340 is a Target Address (DMAT) register that stores the starting target address of the target memory region to which data is to be transferred (e.g., written to the target memory region).

To perform a DMA operation, the host processor (e.g., 210 in FIG. 2) initializes registers 310–340 with the height, width, stride and address of the source and target memory regions. Where either the source memory region, the target memory region, or both are organized in a sequentially-addressable manner, the stride will be the width of one row (in the illustrative row-major ordered embodiment of FIG. 2). After initializing registers 310–340, the host processor relinquishes the bus to the DMA controller 300, and the DMA controller 300 performs the data transfer in a single DMA operation. As described further below, the DMA controller 300 uses the height and width of the source and the target memory regions to determine a "count" (e.g., the quantity) of the data being transferred. That is, the height of the source memory region multiplied by the width of the source memory region indicates the quantity of source data to be read. Likewise, the height of the target memory region multiplied by the width of the target memory region indicates the quantity of target data to be written. In general, the count of the source data to be read will equal the count of the target data to be written, although the height and width of the source and target regions of memory need not be the same.

In one embodiment, after each transfer of data from the source memory region to the target memory region, internal counters 305 are incremented by the size (e.g., a byte, a word, a quad-word) of each source and target memory location to point to the next source and target memory location. At the end of each row of data (e.g., source data or target data), other internal counters 305 of the DMA controller 300 increment the starting source address (and/or starting target address) by the appropriate stride so the next row of data can be transferred during the same DMA operation.

In another embodiment of the present invention, internal counters 305 are incremented in a different manner. As in the previously described embodiment, after each transfer of data from the source memory region to the target memory region, internal counters 305 are incremented by the size of each source and target memory location to point to the next source and target memory location. However, in contrast to the previously described embodiment, at the end of each row of data (e.g., source data or target data), the internal counters 305 are incremented by the stride of the memory region, minus the width of the memory region plus one (i.e., S−W+1). As should be appreciated by those skilled in the art, other methods of incrementing counters 305 using the stride of source and target memory regions to point to the next addressable memory locations in the source and target memory regions may alternatively be used, and are considered to be within the scope of the present invention.

After the quantity of data indicated by the count has been transferred, the DMA controller 300 relinquishes the bus 370 and the DMA operation is complete. In this manner, the DMA controller 300 only needs to be initialized once for a data transfer involving source and/or destination memory regions that are organized in a rectangular (i.e., contiguous, but not sequentially-addressable) manner.

By considering the height, width, and stride of both source and target memory regions, DMA transfers to and/or from memory regions that are organized in a rectangular manner can be performed in a single DMA operation. In particular, the present invention permits transfers to and/or from memory regions organized in a rectangular manner to be performed significantly faster than with conventional DMA controllers. Moreover, where the memory regions that are organized in a rectangular manner include a large number of short rows of memory locations (i.e., the height of the rectangular memory region is significantly greater than its width), even more significant performance increases are attained.

It should be appreciated that a conventional DMA controller is necessarily limited by the smallest sequentially-addressable sub-region in either source or target regions of memory, whereas the present invention is not. That is, where both source and target regions of memory include sub-regions of memory that are not sequentially-addressable between sub-regions, any conventional DMA transfer between source and target memory regions is limited to the shortest of the source or target sub-region of sequentially-addressable memory locations. For example, where each row of the source memory region includes fifteen sequentially-addressable memory locations and each row of the target memory region includes five sequentially-addressable memory locations, any conventional DMA transfer between source and target memory regions is limited to a quantity of five memory locations (i.e., the shorter of the source and target memory sub-regions of sequentially-addressable memory locations).

Figure 4:
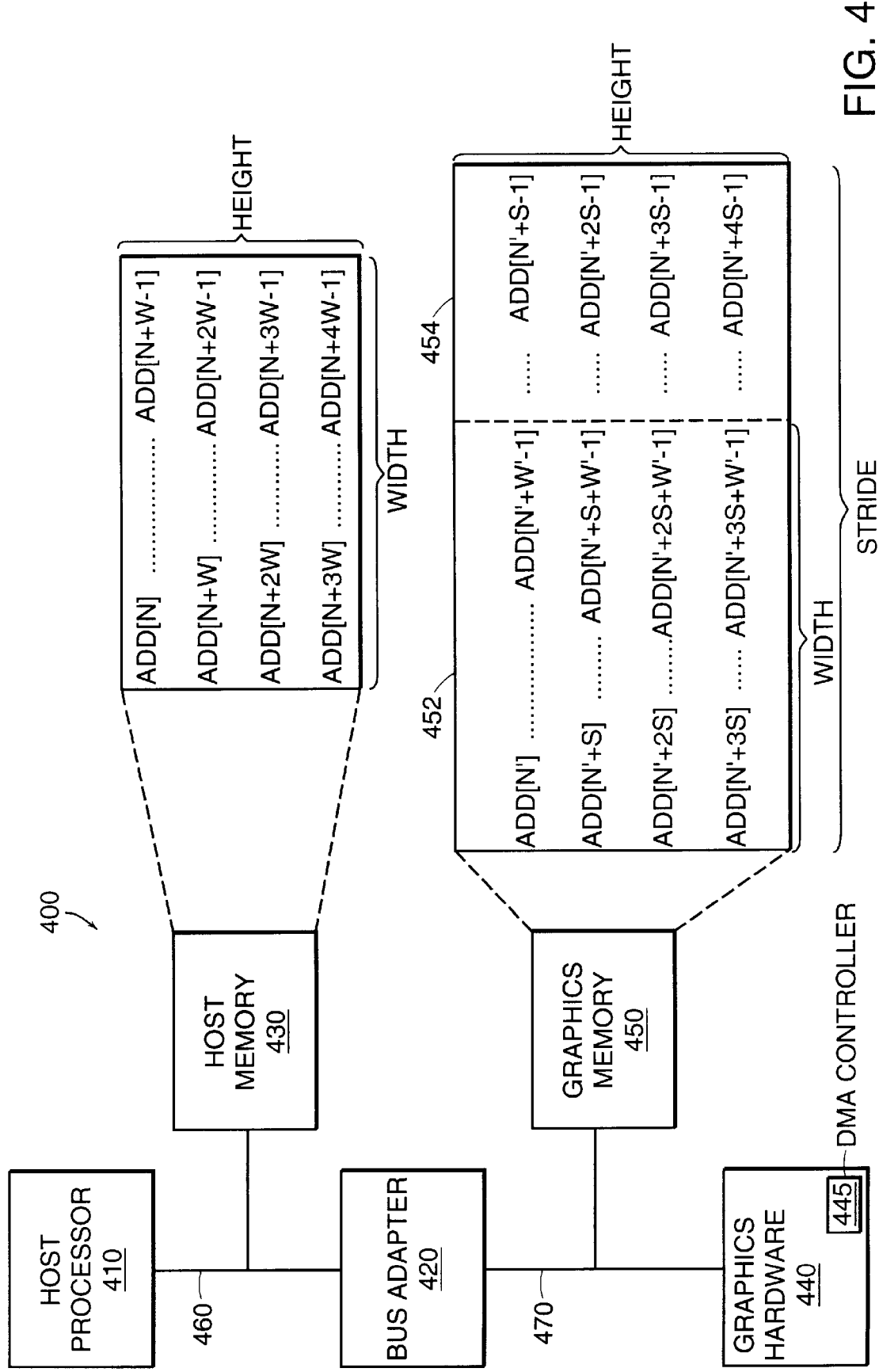
FIG. 4 is a functional block diagram of a computer graphics system that includes a DMA controller according to another embodiment of the present invention.

As noted, although the DMA controller described above can be used in any computer system, it is particular well adapted for use in computer graphics systems, such as 2-D or 3-D graphics systems. FIG. 4 shows an illustrative embodiment of a computer graphics system 400 having graphics hardware 440 that includes a DMA controller 445 according to an embodiment of the present invention. FIGS. 5–8 describe the structure and operation of the DMA controller 445 in further detail.

As shown in FIG. 4, the computer graphics system 400 includes host processor 410, bus adapter 420, host memory 430, graphics hardware 440, and graphics memory 450. As in the graphics system 200 of FIG. 2, the host processor 410 communicates with host memory 430 over host memory bus 460, and the graphics hardware 440 communicates with graphics memory 450 over graphics memory bus 470. In a manner similar to that described with respect to FIG. 2, devices on host memory bus 460 communicate with devices on graphics memory bus 470 via the bus adapter 420 (e.g., an Intel® 440BX). Memory locations in host memory 430 are organized in a sequentially-addressable manner in row-major order and may form a 64-bit address space. Storage locations in host memory 430 range from address N to address N+4W−1 in a sequentially-addressable manner, where "W" is again used to denote the width of the host memory region (e.g., the number of columns in each row of host memory). Thus, if W=10, Row 1 includes memory locations ranging from address 1(N) to 10(1+10−1). Row 2, includes memory locations ranging from address 11(N+W) to 20(1+(2)(10)−1), and so on.

As in the graphics hardware 240 of FIG. 2, graphics hardware 440 may include number of special purpose processors such as a geometry accelerator, a rasterizer, texture mapping hardware, etc. According to an embodiment of the present invention, graphics hardware 440 also includes a DMA controller 445 that can be used to transfer data between storage locations in host memory 430 and storage locations in graphics memory 450. In the exemplary graphics system 400 shown in FIG. 4, graphics memory 450 is partitioned into two rectangular regions 452, 454, each having an associated height (i.e., rows) and width (i.e., columns). As the amount of graphics memory 450 is generally much less than the amount of host memory 430, the graphics memory may be formed from a 32-bit address space. Thus, in the exemplary embodiment of FIG. 4, the host memory 430 and the graphics memory 450 have different address spaces.

Once again, although graphics memory 450, as a whole, is organized as an array of sequentially-addressable storage locations, each rectangular region 452, 454 of memory 450 includes sub-regions of sequentially-addressable storage locations (i.e., rows of memory) that are not sequentially-addressable between the sub-regions themselves (i.e., between the first storage location in row I and the last storage location in row I-1). That is, the rows of sequentially-addressable storage locations are separated from one another by a some number of memory locations (i.e., "stride"). The stride separating the first storage location in Row I of region 452 from the first storage location in Row I-1 of region 452 is again denoted by "S", and the width of rectangular region 252 is again denoted by "W'".

Figure 5:
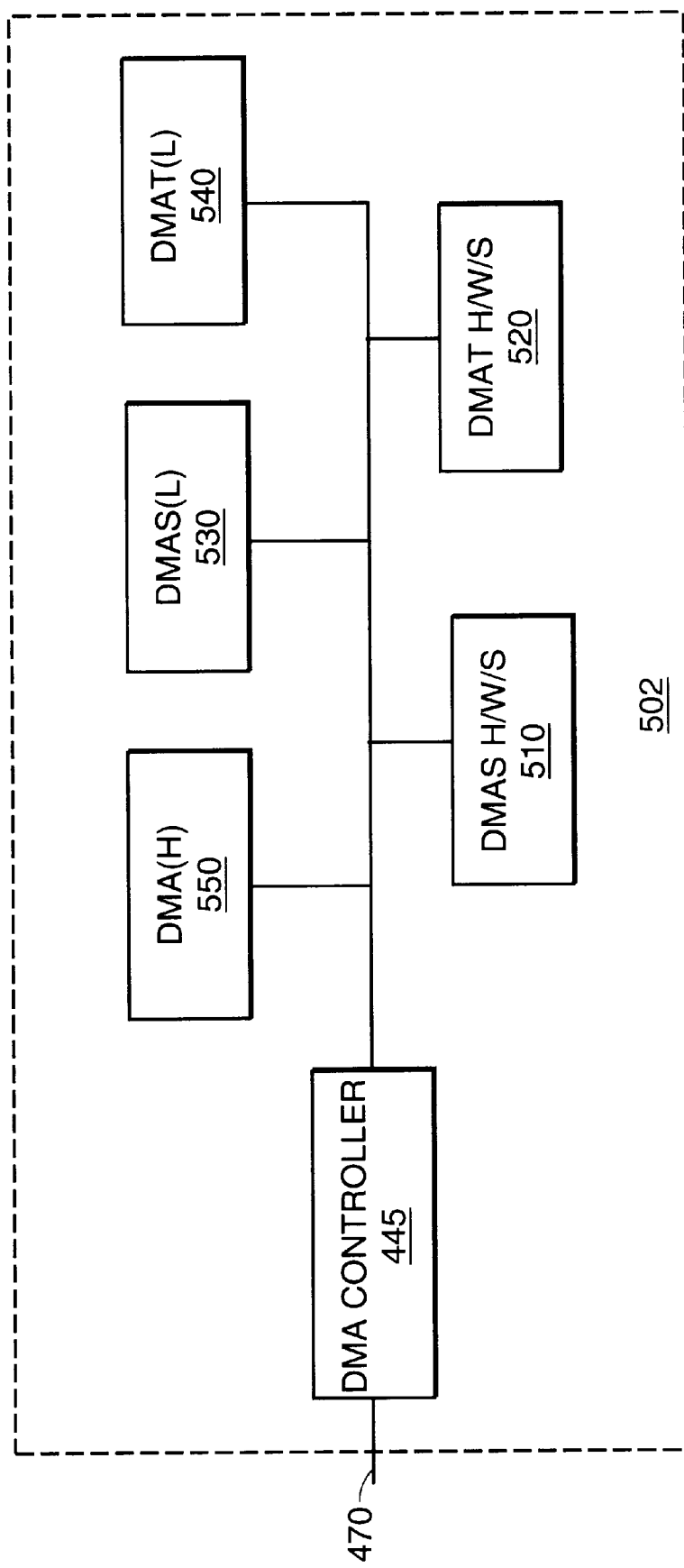
FIG. 5 is a functional block diagram of an alternative embodiment of a DMA controller, including a number of source and target registers that allows for differences in the address space of source and target memory.

FIG. 5 is a functional block diagram illustrating a more detailed view of one embodiment of the DMA controller 445 for use with the graphics system 400 of FIG. 4. The embodiment of DMA controller 445 shown in FIG. 5 is particularly well adapted for use in graphics systems in which host memory 430 and graphics memory 450 have different sized address spaces. In particular, DMA controller 445 allows for different address spaces and sizes in source and target memory while minimizing the amount of register space that is needed to store source and target starting addresses. Although the embodiment of FIG. 5 is described with reference to a 64-bit host memory address space and a 32-bit graphics memory address space, it should be appreciated that similar principles can be used with a 32-bit host memory address space and a 16-bit graphics memory address space, as well as with graphics systems where the graphics memory space is larger than the host memory address space.

As shown in the embodiment of FIG. 5, DMA controller 445 is connected to the graphics memory bus 470 and includes a number of different registers 510, 520, 530, 540, 550 for storing source and target information. It should appreciated that different registers are not necessary to practice the invention, as a single register having number of storage locations may alternatively be used. Moreover, the registers can be separated from the DMA controller 445, for example in a memory that is accessible to the host processor 410 and the DMA controller 445. In one embodiment of the present invention, the DMA controller 445 and registers 510, 520, 530, 540, and 550 are included as part of a single DMA system 502. This embodiment is graphically depicted by the dashed line surrounding the DMA controller 445 and registers 510–550. However it should be appreciated that registers 510–550 can also be separate from the DMA controller 445, in any form of memory that is accessible to the host processor (e.g., host processor 410 in FIG. 4) and the DMA controller 445.

As shown in FIG. 5, DMA controller 445 includes a Source Height/Width/Stride register (DMAS H/W/S) 510 that stores information identifying the height (i.e., in terms of rows in the illustrative row-major ordered embodiment of FIG. 4), the width (i.e., in terms of columns in the illustrative row-major ordered embodiment of FIG. 4), and the stride of the source memory region from which data is to be transferred by the DMA controller 445. Similarly, Target Height/Width/Stride register (DMAT H/W/S) 520 stores information identifying the height, width, and stride of the target memory region to which data is to be transferred by the DMA controller 445. Register 530 is a Low Order Source Address register (DMAS(L)) that is used to store information identifying the low order bits of the starting source address of the source memory region from which source data is to be read, and register 540 is a Low Order Target Address register (DMAT(L)) that is used to store information identifying the low order bits of the starting target address of the target memory region to which the source data is to be written.

In contrast to the DMA controller 300 of FIG. 3, only the low order address bits, rather than all of the address bits of the starting source address and the starting target address are stored in registers 530 and 540. This modification reduces the amount of memory that is needed to store source and target information within the DMA controller 445, as typically only one of the source and target addresses will require 64-bit addressing capability. In particular, the graphics memory (e.g., graphics memory 450 in FIG. 4) of most graphics systems is typically addressed using only 32 bits, whereas the host memory (e.g., host memory 430 in FIG. 4), which is generally much larger than graphics memory, is often addressed using 64 bits.

To account for this difference, DMA controller 445 also includes a Host Memory High Order Address Bits register 550 (DMA(H)) that is used to store the high order address bits of a DMA source or target address. Although storing only the low order 32 bits of the source and target in registers 530, 540 limits a single DMA operation to transfers of 4 Gigabytes or less, the savings in terms of register space is warranted as DMA transfers between host memory 430 and graphics memory 450 are unlikely to include more than this quantity of data. Of course, it should be appreciated that register 550 is not necessary to practice the invention, as registers 530 and 540 could alternatively include the full source and target starting addresses. Moreover, it should be appreciated that register 550 could alternatively be used in a similar manner with 32-bit and 16-bit memory spaces.

FIG. 6A illustrates the bit allocation and meaning of the information that is stored in the Host Memory High Order Address Bits (DMA(H)) register 550. As shown in FIG. 6A, each of the bits of this register 550 may be initialized to zero at power on, although this is not necessary to practice the invention. Bits 31–0 are used to store the 32 high-order address bits of a 64-bit addressable host memory region, which may be either the source (e.g., when transferring data from host memory 430 to graphics memory 450 in FIG. 4) or the target (e.g., when transferring data from graphics memory 450 to host memory 430) of a DMA transfer operation. It should be appreciated that the high order bits 31–0 identify the location of host memory from the point of view of the DMA controller 445, as these bits may not necessarily be the identical to those used by the host processor 410 to access that same location (e.g., when addresses used by the host processor are subject to an initial decoding).

FIG. 6B illustrates the bit allocation and meaning of the information that is stored in the Source Height/Width/Stride (DMAS H/W/S) register 510. As shown in FIG. 6B, bits 31–0 are divided into four regions. Bits 31–22 represent the number of rows of the source memory region (e.g., the height of the source memory region) to be read, and bits 21–11 represent the number of columns of the source memory region to be read in each row of the source memory region (e.g., the width of the source memory region), in terms of quad-words (i.e., 64 bits). Bits 10–1 represent the distance between the first storage location in row I and the first storage location in row I-1 (e.g., the stride of the source memory region), in terms of quad-words. The least significant bit (i.e., bit 0) represents a validity bit that is set by the host processor 410 and used to inform the DMA controller 445 that the contents of this register 510 are valid. As shown in FIG. 6B, each of the bits of this register 510 may be initialized to zero at power on, although, once again, this is not necessary to practice the invention. It should be appreciated that other bit allocations for register 510 (as well as registers 520, 530, and 540) may be used, as well known to those skilled in the art.

FIG. 6C illustrates the bit allocation and meaning of the information that is stored in the Target Height/Width/Stride (DMAT H/W/S) register 520. As shown in FIG. 6C, the contents of this register 520 are similar to the contents of the DMA Source Height/Width/Stride register described immediately above, only the information stored therein pertains to the target memory region.

FIG. 6D illustrates the bit allocation and meaning of the information that is stored in the Low Order Source Address (DMAS(L)) register 530. As shown in FIG. 6D, bits 31–0 are divided into four regions. Bits 31–3 represent the low order address bits of the starting source address from which data is to be transferred (i.e., read). Together with the High Order Address Bits (e.g., register 550), a 64-bit address space can be specified for either the source or target of the DMA operation. Bit 2 is a control bit identifying whether to read/write from/to the host memory and write/read to/from the graphics memory. Bit 1 is not used in this embodiment. However, in alternative embodiments this bit may be used to identify whether the starting source address is a 32-bit address or a 64-bit address. When such a control bit is set (i.e., one), each source address is a 32-bit address (i.e., in graphics memory) and each target address is a 64-bit address (i.e., in host memory), and when the control bit is cleared (i.e., zero), each source address is a 64-bit address and each target address is a 32-bit address. In alternative embodiments, bit 1 may also be used to indicate whether both the source address and the target address are 32-bit addresses to perform a DMA transfer from one 32-bit addressable memory region to another. The least significant bit (i.e., bit 0) represents a validity bit that is set by the host processor 410 and used to inform the DMA controller 445 that the contents of this register 530 are valid. As shown in FIG. 6D, each of the bits of this register 530 may be initialized to zero at power on.

FIG. 6E illustrates the bit allocation and meaning of the information that is stored in the Low Order Target Address (DMAT(L)) register 540. As shown in FIG. 6C, the contents of this register are similar to the contents of the Low Order Source Address register 530 described immediately above. Bits 31–3 represent the low order address bits of the starting target address to which data is to be transferred. As the bit 2 in the Low Order Source Address register 530 already indicates whether the starting source address is a 32-bit or a 64-bit address, bits 2–1 are not used in register 540 and are reserved for future use. The least significant bit (i.e., bit 0) of register 540 represents a validity bit that is set by the host processor 410 and used to inform the DMA controller 445 that the contents of this register 540 are valid. In one embodiment of the present invention, the validity bit of register 540 is also used to enable the DMA process (e.g., enable the transfer of data from source memory to target memory). Accordingly, when the validity bit of Low Order Target Address register 540 is used to enable the DMA process, the contents of this register are written after initializing registers 510, 520, 530, and 550. It should be appreciated that the validity bit of another register (e.g., registers 510, 520, 530, or 540) could also be used to enable the DMA process.

Figure 7:
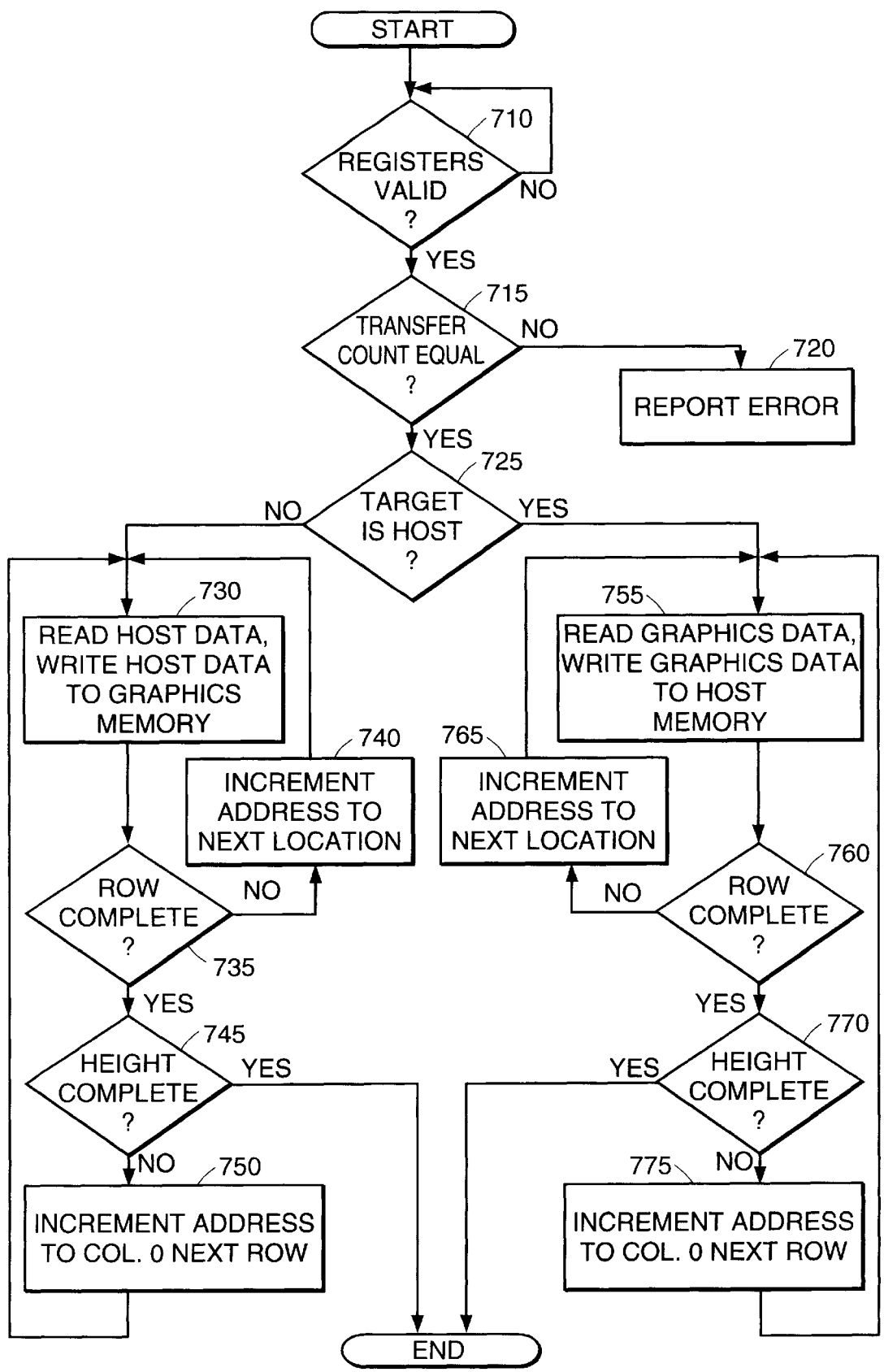
FIG. 7 is a flowchart illustrating an exemplary DMA operation according to an embodiment of the present invention.

FIG. 7 is a flowchart illustrating one exemplary implementation of DMA operation that can be performed by a DMA controller or configured in accordance with the present invention. The DMA operation (e.g., the DMA routine) can be initiated by the host processor as indicated above, in any known manner, for example, by setting the validity bit (i.e., bit 0) in register 540. Although registers 510, 520, 530, 540, and 550 may be initialized by the host processor in any order, it should be appreciated that the register that initiates the activity of the DMA controller (e.g., register 540) should be initialized after the other registers (e.g., registers 510, 520, 530, 550) have been initialized by the host processor. Alternatively, the DMA controller can periodically poll a selected memory location that can be written by the host processor with a control bit to indicate a DMA operation is desired. The control bit may be set by the host processor after each of registers 510, 520, 530, 540, and 550 have been initialized to ensure that these registers contain valid information. Many other ways are possible; all considered to be within scope of the present invention.

At step 710, the DMA controller reads the validity bit in each of registers 510, 520, 530, and 540 to verify that the each of the registers contain valid data. When one or more of the registers does not contain valid data, the DMA controller reports an error or waits until the register contents are properly initialized, or both.

At step 715, the DMA controller compares the count of the Source and Target Height/Width/Stride registers 510, 520 to determine whether the quantity of data to be read from the source memory region is equal to the quantity of data to be written to the target memory region. This may be performed by multiplying the number of rows (i.e., the height) of source and target memory by the number of columns (i.e., the width) in each row of source and target memory in the illustrative row-major ordered embodiment of FIG. 4. The stride of the source and target memory regions is not necessary for the determination in step 715. When the quantity of data to be read from the source memory region does not equal the quantity of data to be written to the target memory region, the DMA controller may, for example, report an error to the host processor (e.g., step 720). Other error reporting and recovery techniques may be used. Alternatively, when the quantity of data to read from the source memory region equals the quantity of data to be written to the target memory region, the DMA controller proceeds to step 725.

At step 725, the DMA controller determines whether the target memory region is in host memory or graphics memory. This can be determined from the control bit (i.e., bit 2) in the Low Order Source address register 530 for example. In such an embodiment, when the control bit is set (e.g., one), the source memory region resides in graphics memory, and thus, the target memory region resides in host memory, and when the control bit is cleared (e.g., zero) the source memory region resides in host memory, and thus, the target memory region resides in graphics memory. When the target memory region resides in graphics memory (i.e., a transfer of data from host memory to graphics memory), steps 730–750 are performed, and when the target memory region resides in host memory (i.e., a transfer of data from graphics memory to host memory), steps 755–775 are performed. As the operation of the DMA controller is similar for both directions of data transfer, only steps 730–750 are described in detail herein.

When the target memory region resides in graphics memory (i.e., step 725 No), the DMA controller proceeds to step 730. At step 730, the DMA controller reads host data from the first column in the first row of the host memory region and writes that host data to the first column of the first row of the graphics memory region, wherein the DMA controller proceeds to step 735. At step 735, the DMA controller makes a determination as to whether all of the host data in the first row of the host memory region has been read from host memory and written to the graphics memory region. When there is additional host data in the first row of the host memory region to be read and written to the graphics memory region, the DMA controller proceeds to step 740. At step 740 the DMA controller increments counters for the host and graphics memory regions to point to the address of the next location to be read from the host memory region and written to the graphics memory region. When the width of the host memory region and the graphics memory region are not equal, step 740 may include incrementing the counter for the graphics memory region to point to a location in the next row of the graphics memory region (e.g., by incrementing the graphics memory region location by the stride of the graphics memory region). After incrementing the counters in step 740, the DMA controller returns to step 730, wherein the host data in the next location of the host memory region is read and written to the next location in the graphics memory region. This process is repeated until it is determined, at step 735, that all of the host data in the first row of the host memory region has been read and written to the graphics memory region.

When it is determined at step 735 that all of the host data in the first row of the host memory region has been read and written to the graphics memory region, the DMA controller proceeds to step 745. At step 745, the DMA controller makes a determination as to whether all of the rows of the host memory region have been written to the graphics memory region. This may be determined, for example, by comparing the height of the host memory region to the number of rows of the host memory region that have been read by the DMA controller and written to the graphics memory region. When there are additional rows in the host memory region to be read and written to the graphics memory region (i.e., step 745 No), the DMA controller proceeds to step 750, wherein address of the host memory region is incremented to point to the next row of the host memory region to be read. After incrementing the address of the host memory region to point to the next row in the host memory region, the DMA controller returns to step 730 and executes steps 730–745 for the next row of host data. As noted above with respect to the DMA controller 300, other techniques for incrementing the counters that are based upon the stride of source and target memory may alternatively be used.

Alternatively, when it is determined at step 745 that all the rows of the host memory have been read and written to the graphics memory region, the DMA operation is complete. Upon completion of the DMA operation, the DMA controller may generate an interrupt to the host processor to indicate the completion of the DMA operation. Alternatively, a status register may be written by the DMA controller, and polled by the host processor to indicate completion of the DMA operation.

When the target of the DMA operation is a host memory region rather than a graphics memory region, the operation of the DMA controller is similar to that described immediately above, but the direction of transfer is from the graphics memory region to the host memory region.

As indicated above, the DMA controller can transfer data between a sequentially-addressable host memory region and any rectangular region of graphics memory in a single DMA operation. This allows the DMA controller of the present invention to transfer data between host and graphics memory regions up to twenty times faster than conventional DMA controllers. Moreover, when the height of a rectangular region of memory is significantly larger than its width, even more significant performance increases are achieved. The present invention can also be used to transfer data between two regions of memory that are each organized in a rectangular manner. For example, because registers 510 and 520 indicate the height, width, and stride of both source and target memory regions, the present invention can be used to transfer data from one rectangular region to another in a single DMA operation. Furthermore, there is no requirement that the height, width, and stride of source and target memory regions be equal, as they generally are not. Although the present invention has been described in terms of host and graphics memory regions that are organized in row-major order, it should be appreciated that the present invention may also be used with memory regions that are organized in column-major order. Moreover, the present invention may also be used with graphics systems in which one region of memory is organized in row-major order, and another region of memory is organized in column major order.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computer graphics system comprising:
    a host computer including a host processor and a host memory accessible by said host processor, said host memory having a source subregion of contiguous, non-sequentially addressable source memory locations;
    a graphics system responsive to said host processor for rendering images on a display device, including a graphics memory having a target subregion of contiguous, non-sequentially-addressable target memory locations equal in number to said source memory locations; and
    a direct memory access (DMA) controller configured to transfer, in a single DMA operation, data stored in said memory locations of said source subregion to said memory locations of said target subregion.

2. The computer graphics system of claim 1, wherein said source subregion is defined by a height of said source subregion, a width of said source subregion and a stride of said source subregion;
    wherein said target subregion is defined by a height of said target subregion, a width of said target subregion and a stride of said target subregion,
    wherein at least one of said source stride and said target stride is greater than said source width and said target width, respectively.

3. The computer graphics system of claim 2, further comprising:
    a first set of one or more registers in which values representing said source height, source width, source stride and a starting address of said source subregion are stored, and
    a second set of one or more registers in which values representing said target height, target width, target stride and a starting address of said target subregion are stored;
    wherein said host processor writes said values to said registers and said DMA controller reads said values from said registers in response to a single data transfer request generated by said host processor.

4. The computer graphics system of claim 3, wherein one or more of said source height, source width and source stride are not equal to said target height, target width and target stride, respectively.

5. The computer graphics system of claim 3, wherein said single DMA operation is invoked by said host processor storing one or more of said source starting address and said target starting address in said registers.

6. The computer graphics system claim 3, wherein said graphics memory comprises a frame buffer.

7. The computer graphics system claim 3, wherein said source subregion and said target subregion are each logically arranged in one of either row-major order and column-major order.

8. The computer graphics system claim 3, wherein said host memory and said graphics memory have different sized address spaces.

9. The computer graphics system claim 8, wherein said host memory implements 64-bit addressing while said graphics memory implements 32-bit addressing.

10. The computer graphics system claim 8, wherein said registers further comprise:
    a first register in which said source starting address are stored;
    a second register in a low order bits of said target starting address are stored; and
    a third register in which high order bits of said target starting address are stored.

11. A computer graphics system comprising:
    a host processor;
    a host memory accessible by said host processor, said host memory having a source subregion of contiguous source memory locations, said source subregion having a height, a width and a stride;
    a graphics memory having a target subregion of contiguous target memory locations equal in number to said source memory locations, said target subregion having a height, a width and a stride,
    wherein at least one of said source stride and said target stride is greater than said source width and said target width, respectively, resulting in said contiguous memory locations which are non-sequentially-addressable, and wherein one or more of said source height, source width and source stride are not equal to said target height, target width and target stride, respectively; and
    a direct memory access (DMA) control system including,
        a first set of one or more registers in which values representing said source height, source width, source stride and a starting address of said source subregion are stored, and
        a second set of one or more registers in which values representing said target height, target width, target stride and a starting address of said target subregion are stored;
        a DMA controller configured to utilize said values stored in said registers to transfer, in a single DMA operation, data stored in said memory locations comprising said source subregion to said memory locations comprising said target subregion.

12. The computer graphics system of claim 11, further comprising:
    a first set of one or more registers in which values representing said source height, source width, source stride and a starting address of said source subregion are stored, and
    a second set of one or more registers in which values representing said target height, target width, target stride and a starting address of said target subregion are stored;
    wherein said host processor writes said values to said registers and said DMA controller reads said values from said registers in response to a single data transfer request generated by said host processor.

13. The computer graphics system of claim 12, wherein said single DMA operation is invoked by said host processor storing one or more of said source starting address and said target starting address in said registers.

14. The computer graphics system claim 11, wherein said graphics memory comprises a frame buffer.

15. The computer graphics system claim 11, wherein said source subregion and said target subregion are each logically arranged in one of either row-major order and column-major order.

16. The computer graphics system claim 11, wherein said host memory and said graphics memory have different sized address spaces.

17. The computer graphics system claim 16, wherein said host memory implements 64-bit addressing while said graphics memory implements 32-bit addressing.

18. The computer graphics system claim 17, wherein said registers further comprise:

a first register in which said source starting address are stored;

a second register in a low order bits of said target starting address are stored; and a third register in which high order bits of said target starting address are stored.

19. A method for transferring data comprising the steps of:

(1) providing a host computer including a host processor and a host memory accessible by said host processor, said host memory having a source subregion of contiguous, non-sequentially-addressable source memory locations;

(2) providing a graphics system responsive to said host processor for rendering images on a display device, including a graphics memory having a target subregion of contiguous, non-sequentially addressable target memory locations equal in number to said source memory locations;

(3) transferring, in a single DMA operation, data stored in said memory locations comprising said source subregion to said memory locations comprising said target subregion.

20. The method of claim 19, wherein said step (3) includes one of steps of:

(a) writing, by the host computer, into one or more registers, values representing a source height, a source width and a source stride collectively defining said source subregion, and a target height, a target width and a target stride collectively defining said target subregion, wherein at least one of said source stride and said target stride is greater than said source width and said target width, respectively;

(b) reading from said one or more registers, by the graphics system, said values representing said source height, width and stride, and said values representing said target height, width and stride;

(c) transferring, in a single DMA operation, data stored in said source memory region defined by said retrieved source height, width and stride to said target memory region defined by said target height, width and stride.

21. The method of claim 20, wherein said step (3)(c) comprises steps of:

1) reading, during a single DMA operation, data stored in said source memory region in an address-sequential manner beginning with said source start address; and 2) writing, during said single DMA operation, data retrieved from said source memory region into said target memory region in an address-sequential manner beginning with said target start address.

22. The method of claim 21, wherein said step (3)(c) further comprises the steps of:

3) multiplying said source height and source width to determine the number of said source memory locations;

4) multiplying said target height and target width to determine the number of said target memory locations; and 5) verifying that the number of said source memory locations is equal to the number of said target memory locations prior to performing said steps 1) and 2).

23. The method of claim 21, wherein said step (3)(c) further comprises the steps of:

3) setting a first pointer to said source starting address;

4) setting a second pointer to said target starting address;

5) reading data from said source starting address;

6) writing the data read from said source starting address to said target starting address;

7) incrementing said first pointer by one of either one or said source stride to point to a next sequential source memory address;

8) incrementing said second pointer by one of either one or said target stride to point to a next sequential target memory address; and 9) repeat steps 5) through 7) until all data is transferred from said source subregion to said target subregion.

* * * * *